(12) United States Patent
Kowkutla et al.

(10) Patent No.: US 11,899,563 B2
(45) Date of Patent: Feb. 13, 2024

(54) SYSTEM ON A CHIP WITH AN INTEGRATED CONFIGURABLE SAFETY MASTER MICROCONTROLLER UNIT

(71) Applicant: TEXAS INSTRUMENTS INCORPORATED, Dallas, TX (US)

(72) Inventors: Venkateswar Kowkutla, Allen, TX (US); Raghavendra Santhanagopal, Dallas, TX (US); Chunhua Hu, Plano, TX (US); Anthony Frederick Seely, Wylie, TX (US); Nishanth Menon, Plano, TX (US); Rajesh Kumar Vanga, Bangalore (IN); Rejitha Nair, Southlake, TX (US); Siva Srinivas Kothamasu, Frisco, TX (US); Kazunobu Shin, Plano, TX (US); Jason Peck, Sugar Land, TX (US); John Apostol, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 72 days.

(21) Appl. No.: 17/686,348

(22) Filed: Mar. 3, 2022

(65) Prior Publication Data
US 2023/0205672 A1    Jun. 29, 2023

Related U.S. Application Data

(60) Provisional application No. 63/294,428, filed on Dec. 29, 2021.

(51) Int. Cl.
*G06F 13/10* (2006.01)
*G06F 11/36* (2006.01)
*G06F 9/4401* (2018.01)
*G06F 11/30* (2006.01)

(52) U.S. Cl.
CPC ........ *G06F 11/3656* (2013.01); *G06F 9/4401* (2013.01); *G06F 11/3048* (2013.01); *G06F 13/102* (2013.01); *G06F 2201/86* (2013.01); *G06F 2213/0038* (2013.01)

(58) Field of Classification Search
None
See application file for complete search history.

(56) References Cited

U.S. PATENT DOCUMENTS

2021/0208189 A1* 7/2021 Flores ................ G01R 31/2803

* cited by examiner

*Primary Examiner* — Scott C Sun
(74) *Attorney, Agent, or Firm* — Michael T. Gabrik; Frank D. Cimino

(57) ABSTRACT

A system on a chip (SoC) includes a first domain comprising a first processor configured to boot the SoC, and a first debug subsystem, a second domain comprising a second processor, the second domain configurable as either a safety domain or a general-purpose processing domain, and isolation circuitry between the first domain and the second domain. During boot-up of the SoC, the first processor provides code to the second domain which, when executed by the second processor, configures the second domain as either a safety domain or as a general-purpose processing domain.

20 Claims, 4 Drawing Sheets

SYSTEM ON A CHIP WITH AN INTEGRATED CONFIGURABLE SAFETY MASTER MICROCONTROLLER UNIT

CROSS-REFERENCE TO RELATED APPLICATION

This application claims priority to application Ser. No. 63/294,428, filed Dec. 29, 2021.

BACKGROUND

Systems on a chip (SoCs) are complex integrated circuits typically including all or most components of a computer or other complex electronic system. They often include multiple microcontroller units (MCUs), memory, graphics processing units (GPUs), and a wide variety of input/output (I/O) ports for communication with other devices.

In many applications, functional safety is an important issue. Currently, some systems use a dedicated device on a board to support safety functions. This leads to increased system cost, and increased printed circuit board (PCB) space and power.

Other systems incorporate safety subsystems within a SoC having integrated MCU subsystems. This offers robust functional safety features with reduced cost and power. However, integrating safety subsystems (operating as a safety domain) on the same SoC with application processing subsystems (operating as a main domain) may include adding hardware isolation between the two domains in order to provide full freedom from interference (FFI) of the safety domain.

This may also include adding independent power, reset, and clock controls for the two domains. Further, this solution may also utilize the safety subsystem as a dedicated safety master for the device, locking out all peripherals, memory, and processing units for functional safety use only. In applications that do not require a safety subsystem, this SoC may meet their requirements, but the addition of the safety subsystem increases the cost of the SoC by including a subsystem that goes unused.

SUMMARY

In an implementation, a system on a chip (SoC) includes a first domain comprising a first processor configured to boot the SoC, and a first debug subsystem, a second domain comprising a second processor, the second domain configurable as either a safety domain or a general-purpose processing domain, and isolation circuitry between the first domain and the second domain. During boot-up of the SoC, the first processor provides code to the second domain which, when executed by the second processor, configures the second domain as either a safety domain or as a general-purpose domain.

In another implementation, a method for operating a system on a chip (SoC) comprising a first domain and a second domain, the method includes during boot-up of the SoC, a first processor within the first domain provides code to the second domain which, when executed by a second processor within the second domain, configures the second domain as either a safety domain or a general-purpose processing domain, and isolating the second domain from the first domain when the second domain is operating as a safety domain with isolation circuitry between the first domain and the second domain.

In a further implementation, a system on a chip (SoC) includes a first domain comprising a first processor configured to boot the SoC, and a first debug subsystem, a second domain comprising a second processor, the second domain configurable as either an external safety domain, an internal safety domain, or a general-purpose processing domain, and isolation circuitry between the first domain and the second domain.

During boot-up of the SoC, the first processor provides code to the second domain which, when executed by the second processor, configures the second domain as either an external safety domain, an internal safety domain, or as a general-purpose processing domain by writing to a write-once memory mapped register within the second domain. The isolation circuitry is configured to isolate the second domain from the first domain when the second domain is configured as an external safety domain, and to allow the second domain to monitor the first domain when the second domain is configured as an internal safety domain, and to allow the first domain to control the second domain when the second domain is configured as a general-purpose processing domain.

DETAILED DESCRIPTION

In many implementations of a system on a chip (SoC), it is desirable to incorporate a safety domain. However, typically when the safety domain is not being used, it is essentially a waste of potential processing power that is unutilized during normal operation.

In order to take advantage of this potential processing power during normal operation, a SoC is provided including a domain that is configurable as either a safety domain or a general-purpose processing domain.

Figure 1:
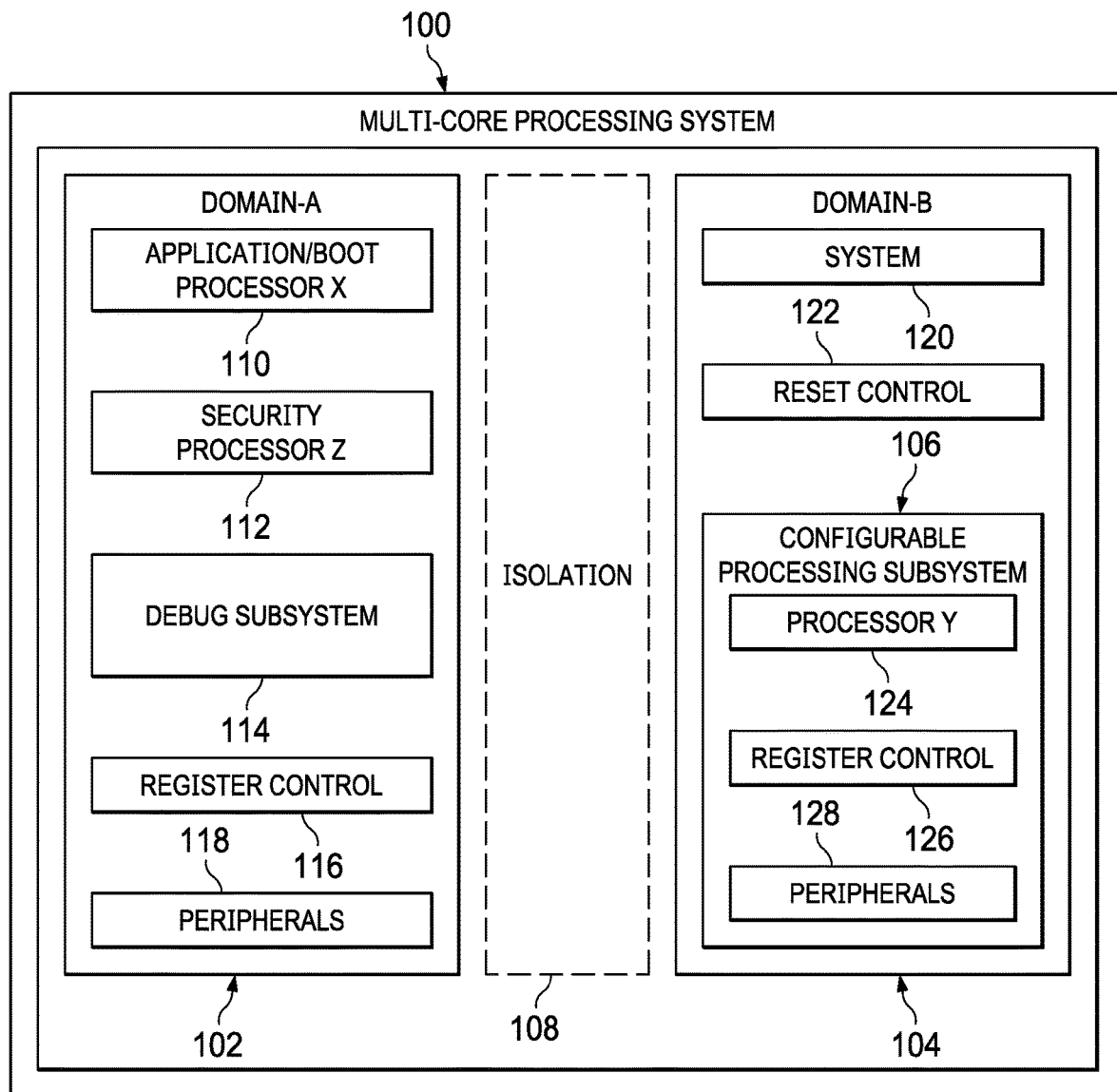
FIG. 1 illustrates a block diagram of an example embodiment of a system on a chip including a configurable safety master microcontroller unit.

FIG. 1 illustrates a block diagram of an example embodiment of a system on a chip 100 including a configurable safety master microcontroller unit 106. In this example embodiment, a SoC 100 comprising a multi-core processing system includes two domains, a first domain, Domain-A 102, and a second domain, Domain-B 104. Domain-A 102 operates as a main domain and during boot-up of SoC 100, provides code to Domain-B 104 which, when executed by a processor within Domain-B 104, configures configurable processing subsystem 106 within Domain-B 104 as either a safety domain or a general-purpose processing domain. In some example embodiments, configurable processing subsystem 106 is configurable as either an external safety domain, an internal safety domain, or as a general-purpose processing domain.

In this example embodiment, Domain-A 102 is isolated from Domain-B 104 by configurable isolation circuitry 108. This isolation circuitry is configurable to allow various levels of isolation between the domains depending on the configuration of configurable processing subsystem 106. For example, when configurable processing subsystem 106 is configured as an external safety domain, the second domain, Domain-B 104 is configured to control and monitor events external to the SoC 100, and the isolation circuitry 108 is configured to isolate the second domain, Domain-B 104 from the first domain, Domain-A 102.

When configurable processing subsystem 106 is configured as an internal safety domain, the second domain, Domain-B 104 is configured to monitor events within the SoC 100, and the isolation circuitry 108 is configured to isolate the second domain, Domain-B 104 from the first domain, Domain-A 102 while allowing the second domain, Domain-B 104 to monitor the first domain, Domain-A 102.

When configurable processing subsystem 106 is configured as a general-purpose processing domain, the isolation circuitry 108 is configured to allow the first domain, Domain-A 102 full access to the second domain, Domain-B 104, and the second processor, Processor Y 124 within configurable processing subsystem 106 is configured to operate as a peripheral to the first domain, Domain-A 102.

In this example embodiment, Domain-A 102 comprises application/boot processor X 110, security processor Z 112, debug subsystem 114, register control 116, and various peripherals 118. Domain-B 104 comprises system 120, reset control 122, and configurable processing subsystem 106. Configurable processing subsystem 106 comprises processor Y 124, register control 126, and various peripherals 128. Note that this is one example embodiment of the present invention. Other embodiments comprise various other combinations of domains, processors, and other components in a wide variety of configurations, all within the scope of the present invention.

In an example embodiment, during boot-up application/boot processor X 110 provides code to the second domain, Domain-B 104, which, when executed by processor Y 124, configures the second domain, Domain-B 104 as either an external safety domain, an internal safety domain, or as a general-purpose processing domain. In some embodiments, based on the code provided by application/boot processor X 110, processor Y 124 indicates the configuration of Domain-B 104 by writing to one or more write-once memory mapped register (MMR) (illustrated in FIG. 2) within the second domain, Domain-B 104. Once this configuration is complete, only the entire SoC 100 power-on reset event may be capable of resetting this configuration.

Domain-A 102 is configured to be able to go into and out of reset independently without disrupting functionality of the safety MCU. During a Domain-A 102 reboot, boot processor X 110 reads the MMR and a reset status register to determine if configurable processing subsystem 106 is operating as a safety domain. If the MMR indicates that configurable processing subsystem 106 is operating as a safety domain, boot processor X 110 skips setup of Domain-B 104 and continues with Domain-A 102 boot-up only.

Figure 2:
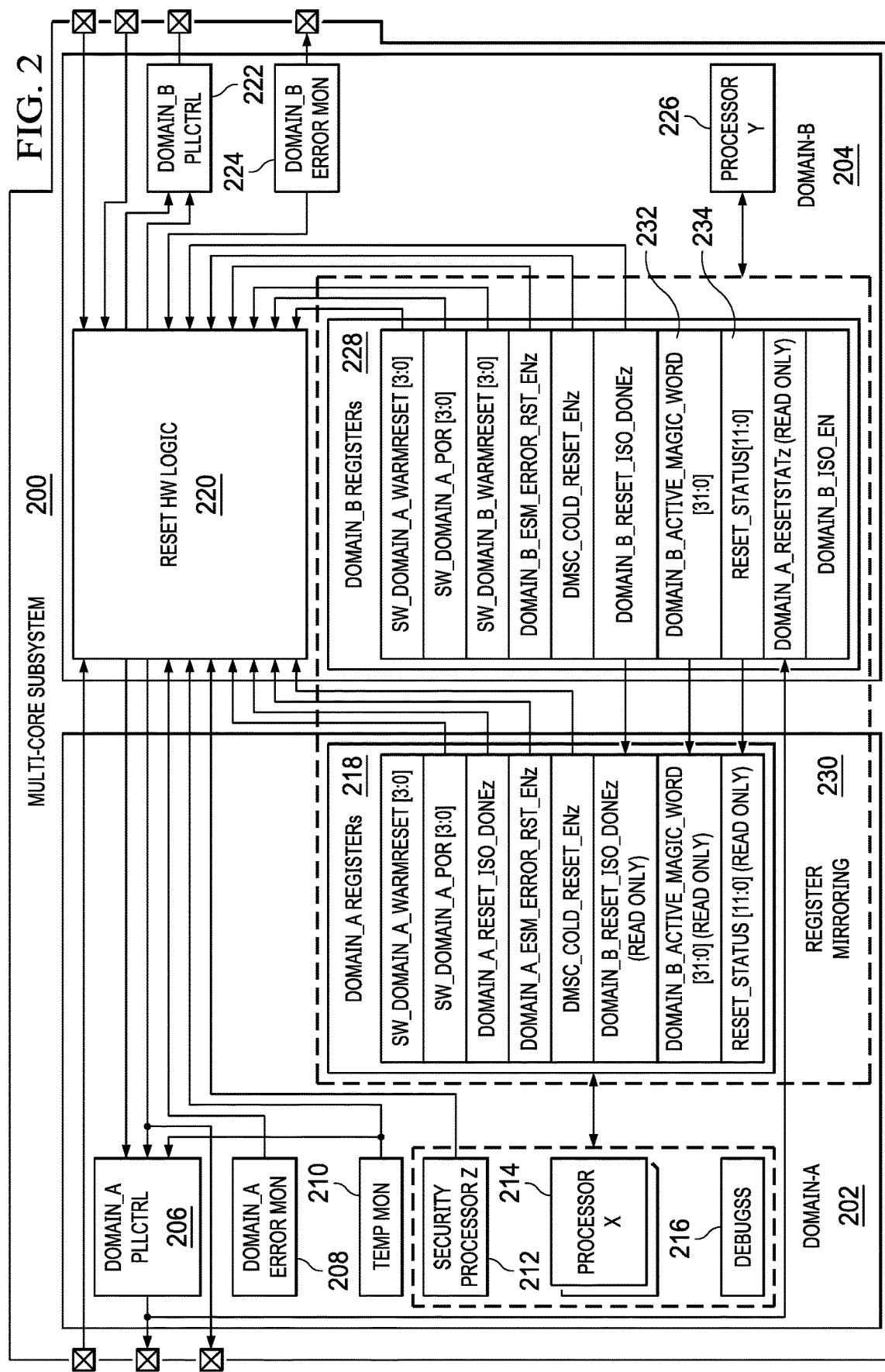
FIG. 2 illustrates a block diagram of an example embodiment of a system on a chip including a configurable safety master microcontroller unit including a memory mapped configuration register.

During boot-up, if the safety MCU is set up as an external safety monitor, the safety MCU island encompassing the safety master is completely isolated from the rest of SoC 100. This mode provides independent power, reset and clock controls to each domain. Events within the rest of SoC 100 do not impact the operation of the safety MCU. The rest of the SoC 100 is capable of going through an entire reset cycle and reboot while the safety MCU is still monitoring external safety events. For external safety monitoring additional MMRs are defined to block all Domain-A 102 events from affecting the safety domain while allowing the safety domain to monitor select events within Domain-A 102. (These additional MMRs are illustrated in FIG. 2.)

During boot-up, if the safety MCU is set up as an internal safety monitor within SoC 100, the chip infrastructure is configured to ensure that the safety MCU is completely isolated from the rest of the SoC 100. However in this case, isolation circuitry 108 is configured to allow the safety MCU to access the rest of SoC 100 to ensure safe operation. If the safety MCU encounters an event that requires rebooting the rest of the chip it is able to do that without affecting its own execution, although it may require some additional isolation steps before the main domain is reset. This mode also provides independent power, reset, and clock controls to each domain. For internal safety monitoring the additional MMRs (illustrated in FIG. 2) are programmed to propagate some desired Domain-A 102 events into the safety MCU subsystem.

During boot-up, if the safety MCU is setup as a general-purpose processor, chip infrastructure configures the safety MCU as just another part of SoC 100. All resources within configurable processing subsystem 106 are available for general-purpose processing, and configurable processing subsystem 106 adds additional processing power to various use cases of the SoC 100. On a reset event the entire SoC 100, including configurable processing subsystem 106 go through the reset sequence. This mode provides shared power, reset, and clock controls to both domains.

While this example embodiment comprises two domains, and three processors, many other SoC configurations are equally capable of implementing the features disclosed herein, all within the scope of the present invention.

FIG. 2 illustrates a block diagram of an example embodiment of a system on a chip 200 including a configurable safety master microcontroller unit 204 including a memory mapped configuration register 232. In this example embodiment, a SoC 200 comprising a multi-core processing subsystem includes two domains, a first domain, Domain-A 202, and a second domain, Domain-B 204. Domain-A 202 operates as a main domain and during boot-up of the SoC 200, configures configurable Domain-B 204 as either a safety domain or a general-purpose processing domain by providing code to Domain-B 204 which, when executed by processor Y 226, configures Domain-B 204. Based on the code provided by processor X 214, processor Y 226 indicates the configuration of Domain-B 204 as either an external safety domain, an internal safety domain, or as a general-purpose processing domain by writing to one or more write-once configuration memory mapped register (MMR) 232 within the second domain, Domain-B 204. In this example embodiment, this MMR 232 is named DOMAIN_B_ACTIVE_MAGIC_WORD and comprises 32 bits, including one or more bits indicating the configuration of Domain-B 204. However, other embodiments use other register naming conventions and other register sizes, all within the scope of the present invention. In some example embodiments, Domain-B 204 is configurable as either an external safety domain, an internal safety domain, or as a general-purpose processing domain.

Domain-A 202 is isolated from Domain-B 204 by configurable isolation circuitry as illustrated in FIG. 1. This isolation circuitry is configurable to allow various levels of isolation between the domains depending on the configuration of Domain-B 204. For example, when Domain-B 204 is configured as an external safety domain, it is configured to control and monitor events external to the SoC 200, and the isolation circuitry is configured to isolate the Domain-B 204 from the Domain-A 202.

When Domain-B 204 is configured as an internal safety domain, it is configured to monitor events within the SoC 200, and the isolation circuitry is configured to allow the Domain-B 204 to monitor the Domain-A 202.

When Domain-B 204 is configured as a general-purpose processing domain, the isolation circuitry is configured to allow Domain-A 202 full access to Domain-B 204, and the second processor, Processor Y 226 within Domain-B 204 is configured to operate as a peripheral to the first domain, Domain-A 202.

In this example embodiment, Domain-A 202 comprises phase locked loop (PLL) controller 206, error monitor 208, temperature monitor 210, security processor Z 212, processor X 214, debug subsystem 216, and a plurality of registers 218. Some of the registers 218 are mirrored from Domain-B 204, and some are memory mapped registers. Domain-B 204 comprises reset hardware logic 220, phase locked loop (PLL) controller 222, error monitor 224, processor Y 226, and a plurality of registers 228. Some of the registers 228 are mirrored 230 into Domain-A 202, and some are memory mapped registers.

By mirroring registers between the two domains, independent hardware resources implemented in Domain-A 202 and Domain-B 204 provide for direct control without involving the other domain while maintaining isolation. This enables two orthogonal software systems to share hardware state and control information without implementing any complex inter-processor communication (IPC) mechanisms across the hardware isolated boundary.

In an example embodiment, during boot-up processor X 214 configures the second domain, Domain-B 204 as either an external safety domain, an internal safety domain, or as a general-purpose processing domain by providing code to Domain-B 204 which, when executed by processor Y 226, configures Domain-B 204. Based on the code provided by processor X 214, processor Y 226 indicates the configuration of Domain-B 204 as either an external safety domain, an internal safety domain, or as a general-purpose processing domain by writing to one or more write-once configuration memory mapped register (MMR) 232 within the second domain, Domain-B 204. Once this configuration is complete, only the entire SoC 200 power-on reset event is capable of resetting this configuration.

Domain-A 202 is configured to be able to go into and out of reset independently without disrupting functionality of the safety MCU. During a Domain-A 202 reboot, processor X 214 reads the configuration register 232 and a reset status register 234 to determine if Domain-B 204 is operating as a safety domain. If the configuration register 232 indicates that Domain-B 204 is operating as a safety domain, processor X 214 skips setup of Domain-B 204 and continues with Domain-A 202 boot-up only.

During boot-up, if the safety MCU is set up as an external safety monitor, the safety MCU island encompassing the safety master is completely isolated from the rest of SoC 200. This mode provides independent power, reset and clock controls to each domain. Events within the rest of SoC 200 do not impact the operation of the safety MCU. The rest of the SoC 200 is capable of going through an entire reset cycle and reboot while the safety MCU is still monitoring external safety events. For external safety monitoring additional MMRs 228 are defined to block out all Domain-A 202 events from entering into the safety MCU subsystem.

During boot-up, if the safety MCU is set up as an internal safety monitor within SoC 200, the chip infrastructure is configured to ensure that the safety MCU is completely isolated from the rest of the SoC 200. However, in this case the isolation circuitry is configured to allow the safety MCU to monitor events within the rest of SoC 200 to ensure safe operation. If the safety MCU encounters an event that requires rebooting the rest of the chip it is able to do that without affecting its own context of execution. This mode also provides independent power, reset, and clock controls to each domain. For internal safety monitoring the additional MMRs 228 are programmed to propagate some desired Domain-A 202 events into the safety MCU subsystem.

During boot-up, if the safety MCU is setup as a general-purpose processor, chip infrastructure configures the safety MCU as just another part of SoC 200. All resources within Domain-B 204 are available for general-purpose processing, and Domain-B 204 adds additional processing power to various use cases of the SoC 200. On a reset event the entire SoC 200, including Domain-B 204 go through the reset sequence. This mode provides shared power, reset, and clock controls to both domains.

Debug subsystem 216 has access to debug features in both Domain-A 202 and Domain-B 204. Debug features provide control over the state of the processor or peripherals that can disrupt operation of the safety domain. In order to provide freedom from interference (FFI) and ensure that a non-safety Domain-A 202 does not disrupt the operation of a safety Domain-B 204 during debug, access to debug features in the safety domain must be blocked.

Figure 4:
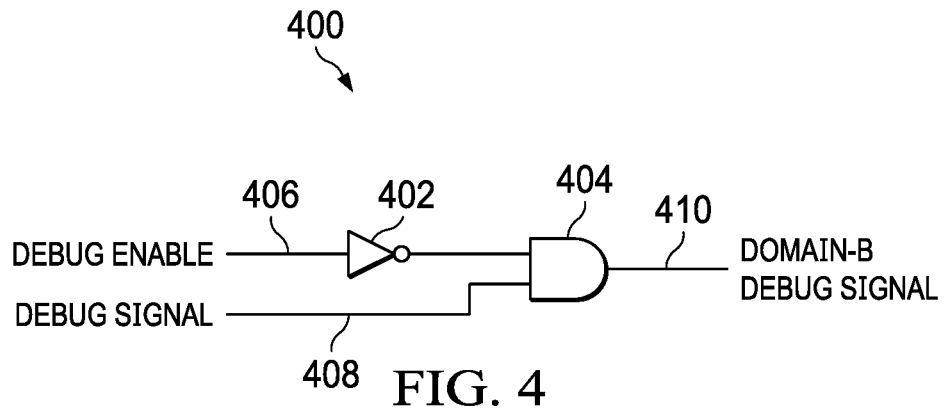
FIG. 4 illustrates an example embodiment of circuitry for isolating debug signals between domains on a system on a chip.

However, it is still necessary to provide access to debug features within safety Domain-B 204 during software development while still maintaining functional isolation. This isolation is provided by debug isolation circuitry such as illustrated in FIG. 4.

While this example embodiment comprises two domains, and three processors, many other SoC configurations are equally capable of implementing the features disclosed herein, all within the scope of the present invention.

Figure 3:
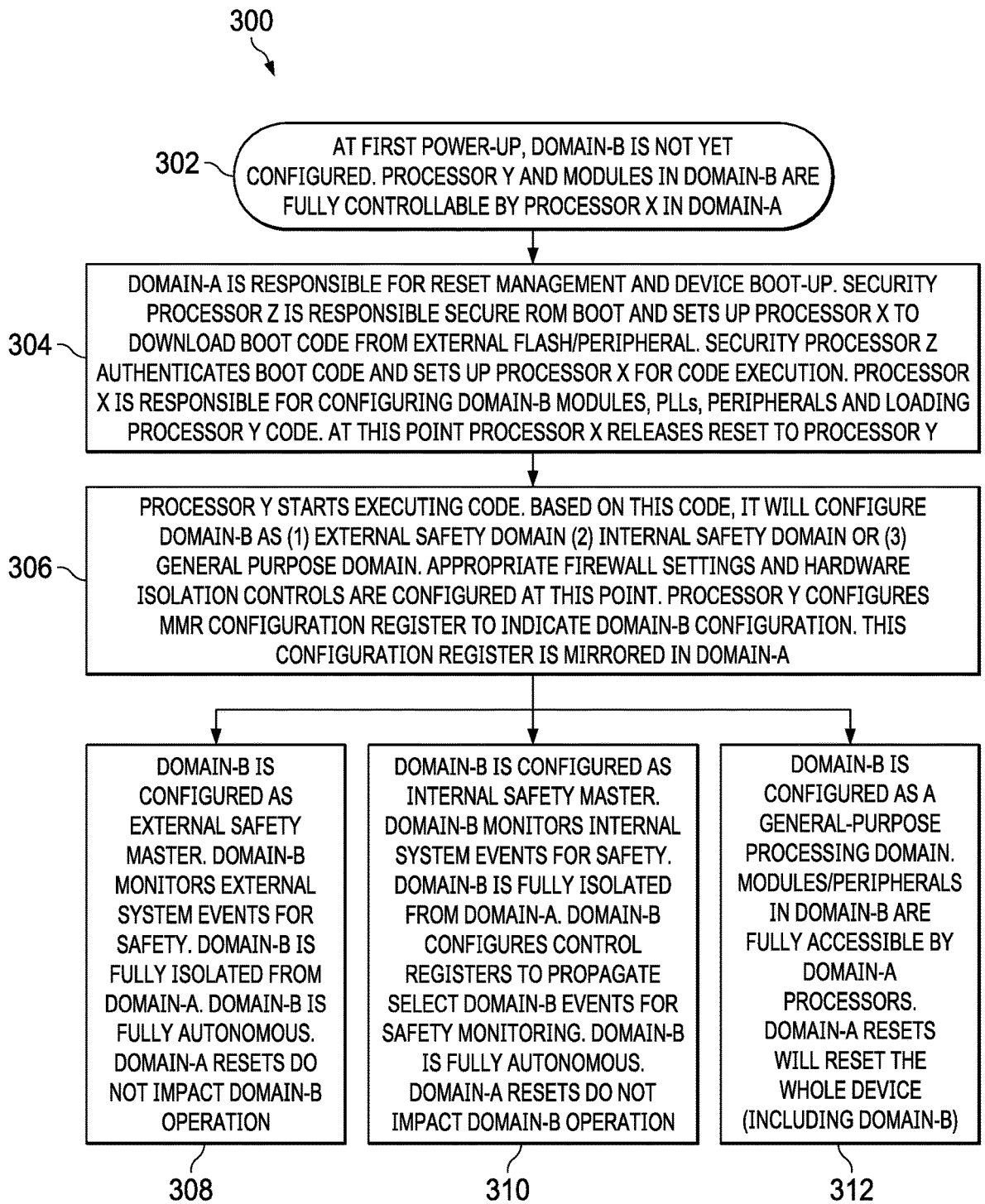
FIG. 3 illustrates a flow chart of an example method for operating a system on a chip including a configurable safety master microcontroller unit.

FIG. 3 illustrates a flow chart 300 of an example method for operating a system on a chip including a configurable safety master microcontroller unit. In this example embodiment, at first power-up, Domain-B 204 is not yet configured. Processor Y 226 and modules in Domain-B 204 are fully controllable by processor X 214 in Domain-A 202, (operation 302).

Domain-A 202 is responsible for reset management and device boot-up. Security processor Z 212 in Domain-A 202 is responsible for secure ROM boot and sets up processor X 214 to download boot code from external flash or other peripherals. Security processor Z 212 authenticates the boot code and sets up processor X 214 for code execution. Processor X 214 is responsible for configuring Domain-B 204 modules, PLLs, peripherals, and loading processor Y 226 code. At this point processor X 214 releases reset to processor Y 226, (operation 304).

Processor Y 226 starts executing code. Based on this code it will configure Domain-B 204 as either (1) an external safety domain, (2) an internal safety domain, or (3) a general-purpose processing domain. Appropriate firewall settings and hardware isolation controls are configured at this point. Processor Y 226 configures the MMR configuration register 228 to indicate the configuration of Domain-B 204. This MMR configuration register 228 is mirrored in Domain-A 202, (operation 306).

If Domain-B 204 is configured as an external safety master, Domain-B 204 monitors external system events for safety. For example, Domain-B 204 may monitor the operation of a wide variety of electronic devices external to the System on a Chip 200, including, but not limited to, external processors, controllers, monitors, data collection devices, and the like. Domain-B 204 may monitor these external devices for any of a variety of error signals, or other indications of their operation. Domain-B 204 is fully isolated from Domain-A 202. Domain-B 204 is fully autonomous. Domain-A 202 resets do not impact Domain-B 204 operation, (operation 308).

If Domain-B 204 is configured as an internal safety master, Domain-B 204 monitors internal system events for safety. For example, Domain-B 204 may monitor the internal operation of various components with Domain-A 202 for error signals, including, but not limited to, Domain-A PLL controller 206, Domain-A error monitor 208, security processor Z 212, and processor X 214. Domain-B 204 is fully isolated from Domain-A 202. Domain-B 204 configures control registers 228 to propagate select Domain-B 204 events for safety monitoring. Domain-B 204 is fully autonomous. Domain-A 202 resets do not impact Domain-B 204 operation, (operation 310).

If Domain-B 204 is configured as a general-purpose processing domain, modules and peripherals in Domain-B 204 are fully accessible by Domain-A 202 processors. Domain-A 202 resets will reset the whole device, including Domain-B 204, (operation 312).

FIG. 4 illustrates an example embodiment of circuitry for isolating debug signals between domains on a system on a chip. In some examples, isolation circuitry 108 contains an instance of the circuitry of FIG. 4 for each debug signal between Domain-A 102 and Domain-B 104. In these examples, debug subsystem 216 provides a plurality of debug signals, (including data, control, clock, request, acknowledge signals, and the like), to Domain-A 102 and Domain-B 104 for used during debugging. These debug signals provide control over the state of the processor or peripherals and may disrupt operation of the safety domain, thus requiring the isolation circuitry illustrated in FIG. 4.

As discussed above, in order to provide freedom from interference (FFI) and ensure that non-safety Domain-A 102 does not disrupt the operation of safety Domain-B 104 during debug, access to debug features in the safety domain must be blocked.

However, it may still be necessary to provide access to debug features within safety Domain-B 104 during software development while still maintaining functional isolation. This isolation is provided by debug isolation circuitry 400 within isolation circuitry 108 of FIG. 1 utilizing a debug enable 406 signal to allow debug signals 408 to propagate into Domain-B debug signals 410 only when the debug enable 406 signal is activated.

In this example embodiment, this isolation is accomplished using an AND gate 404 and an inverter 402. Only when the debug enable signal 406 is low will debug signal 408 be allowed to propagate into Domain-B debug signal 410. In this example, debug enable 406 is active low. Other similar or equivalent circuits are used within other embodiments to gate debug signals between the two domains all within the scope of the present invention.

This hardware debug isolation circuitry 400 is used to enable debug isolation to safety Domain-B 104, blocking all access to debug features including core debug [halt, single step, breakpoints, etc.], debug local power/sleep controller (LPSC) control, and peripheral suspend. Power-on reset default is set to disable this hardware debug isolation logic so that software is able to be debugged during a development phase. Isolation enable controls can only be written once to enable the debug isolation. This is configured only by the safety processor during the safety processor boot time. Once programmed, this hardware control can only be reset by a safety domain power-on reset.

In an example embodiment, two MMR bits are implemented in a Domain-B 104 control MMR to enable independent debug and functional isolation. A first MMR bit, when active isolates Domain-B 104 debug related signals crossing from Domain-A 102 (non-safety) to Domain-B 104 (safety). A second MMR bit, when active isolates all other Domain-A 102 functional signals from crossing into Domain-B 104. Both isolation controls are qualified by the write-once configuration memory mapped register (MMR) 232 of FIG. 2. For Domain-B 104 safety isolation, both MMR bits must be configured to enable isolation on all Domain-A 102 signals crossing into Domain-B 104.

Figure 5:
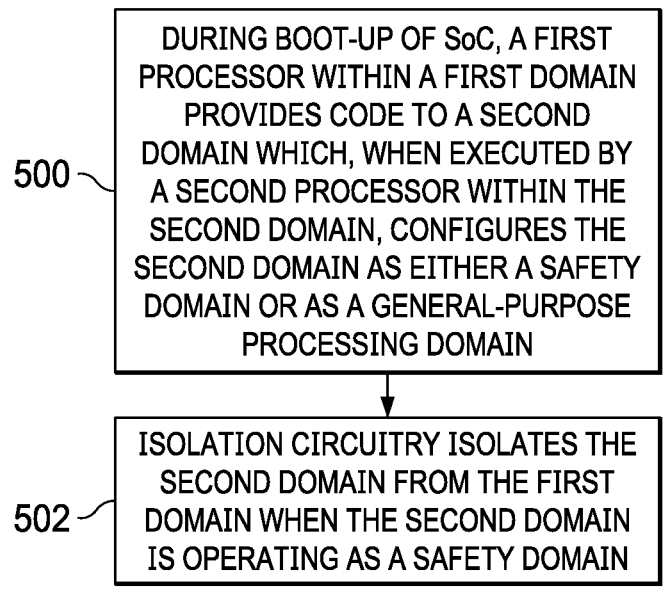
FIG. 5 illustrates a flow chart of an example method for operating a system on a chip including a configurable safety master microcontroller unit.

FIG. 5 illustrates a flow chart of an example method for operating a system on a chip 200 comprising a first domain 202 and a second domain 204 including a configurable safety master microcontroller unit.

During boot-up of the SoC 200, a first processor 214 within the first domain 202 provides code to the second domain 204 which, when executed by the second processor 226, configures the second domain 204 to operate as either a safety domain or a general-purpose processing domain, (operation 500).

Isolation circuitry 108 isolates the second domain 204 from the first domain 202 when the second domain 204 is operating as a safety domain, (operation 502).

Modifications are possible in the described examples, and other examples are possible within the scope of the claims.

What is claimed is:

1. A system on a chip (SoC) comprising:
a first domain comprising a first processor configured to boot the SoC, and a first debug subsystem;
a second domain comprising a second processor, the second domain configurable as either a safety domain or a general-purpose domain; and
isolation circuitry between the first domain and the second domain;
wherein during boot-up of the SoC, the first processor provides code to the second domain which, when executed by the second processor, configures the second domain as either the safety domain or as the general-purpose processing domain.

2. The system on a chip of claim 1, wherein when the second domain is configured as an external safety domain, the second domain is configured to control and monitor events external to the SoC, and the isolation circuitry is configured to isolate the second domain from the first domain.

3. The system on a chip of claim 1, wherein when the second domain is configured as an internal safety domain, the second domain is configured to monitor events within the SoC, and the isolation circuitry is configured to isolate the second domain from the first domain while allowing the second domain to monitor the first domain.

4. The system on a chip of claim 1, wherein when the second domain is configured as a general-purpose processing domain, the isolation circuitry is configured to allow the first domain full access to the second domain, and the second processor is configured to operate as a peripheral to the first domain.

5. The system on a chip of claim 1, wherein the SoC is configured to provide power, clock, and reset signals to the second domain that are independent from power, clock, and reset signals provided to the first domain when the second domain is configured as a safety domain.

6. The system on a chip of claim 1, wherein the SoC is configured to provide shared power, clock, and reset signals to the first domain and the second domain when the second domain is configured as a general-purpose processing domain.

7. The system on a chip of claim 1, wherein, based on the code provided by the first processor, the second processor indicates the configuration of the second domain by writing a memory-mapped configuration register within the second domain.

8. The system on a chip of claim 1, further comprising one or more registers mirrored between the first domain and the second domain, providing each domain status information about the other domain.

9. The system on a chip of claim 1, wherein the second domain also comprises a second debug subsystem, isolated from the first debug subsystem when the second domain is operating as a safety domain.

10. A method for operating a system on a chip (SoC) comprising a first domain and a second domain, the method comprising:
   during boot-up of the SoC, a first processor within the first domain provides code to the second domain which, when executed by a second processor within the second domain, configures the second domain as either a safety domain or a general-purpose processing domain; and
   isolating the second domain from the first domain when the second domain is operating as a safety domain with isolation circuitry between the first domain and the second domain.

11. The method of claim 10, wherein when the second domain is configured as an external safety domain, the second domain is configured to control and monitor events external to the SoC, and the isolation circuitry is configured to isolate the second domain from the first domain.

12. The method of claim 10, wherein when the second domain is configured as an internal safety domain, the second domain is configured to monitor events within the SoC, and the isolation circuitry is configured to isolate the second domain from the first domain while allowing the second domain to monitor the first domain.

13. The method of claim 10, wherein when the second domain is configured as a general-purpose processing domain, the isolation circuitry is configured to allow the first domain full access to the second domain, and the second processor is configured to operate as a peripheral to the first domain.

14. The method of claim 10, wherein the SoC is configured to provide power, clock, and reset signals to the second domain that are independent from power, clock, and reset signals provided to the first domain when the second domain is configured as a safety domain.

15. The method of claim 10, wherein the SoC is configured to provide shared power, clock, and reset signals to the first domain and the second domain when the second domain is configured as a general-purpose processing domain.

16. The method of claim 10, wherein, based on the code provided by the first processor, the second processor indicates the configuration of the second domain by writing a memory-mapped configuration register within the second domain.

17. The method of claim 10, further comprising one or more registers mirrored between the first domain and the second domain, providing each domain status information about the other domain.

18. The method of claim 10, wherein the second domain also comprises a second debug subsystem, isolated from the first debug subsystem when the second domain is operating as a safety domain.

19. A system on a chip (SoC) comprising:
   a first domain comprising a first processor configured to boot the SoC, and a first debug subsystem;
   a second domain comprising a second processor, the second domain configurable as either an external safety domain, an internal safety domain, or a general-purpose processing domain; and
   isolation circuitry between the first domain and the second domain;
   wherein during boot-up of the SoC, the first processor provides code to the second domain which, when executed by the second processor, configures the second domain as either an external safety domain, an internal safety domain, or as a general-purpose processing domain; and
   wherein the isolation circuitry is configured to isolate the second domain from the first domain when the second domain is configured as an external safety domain, and to allow the second domain to monitor the first domain when the second domain is configured as an internal safety domain, and to allow the first domain to control the second domain when the second domain is configured as a general-purpose processing domain.

20. The system on a chip of claim 19, wherein the SoC is configured to provide power, clock, and reset signals to the second domain that are independent from power, clock, and reset signals provided to the first domain when the second domain is configured as a safety domain, and to provide shared power, clock, and reset signals to the first domain and the second domain when the second domain is configured as a general-purpose processing domain.

* * * * *